United States Patent
Zimmermann

(10) Patent No.: US 6,436,527 B1
(45) Date of Patent: Aug. 20, 2002

(54) STRIPPABLE STENCILLING TAPE AND IT USE

(75) Inventor: Dieter Zimmermann, Jork (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 09/333,627

(22) Filed: Jun. 15, 1999

(30) Foreign Application Priority Data

Jun. 18, 1998 (DE) .......................... 198 27 199
Jun. 25, 1998 (DE) .......................... 198 28 350

(51) Int. Cl.$^7$ .......................... C09J 7/02; B05B 15/04; B41N 1/24
(52) U.S. Cl. .................. 428/343; 428/40.1; 428/354; 428/355 RA; 428/355 BL
(58) Field of Search .............. 428/40.1, 343, 428/355 RA, 355 BL, 354; 248/205.3

(56) References Cited

U.S. PATENT DOCUMENTS

| | | | |
|---|---|---|---|
| 4,129,669 A | * 12/1978 | Lopez | .......... 427/282 |
| 5,342,872 A | * 8/1994 | Huber | .......... 428/294 |
| 5,464,692 A | 11/1995 | Huber | |
| 5,491,012 A | 2/1996 | Lühmann et al. | |
| 5,626,931 A | 5/1997 | Lühmann | |
| 5,626,932 A | 5/1997 | Lühmann et al. | |
| 5,725,923 A | 3/1998 | Lühmann | |
| 5,897,949 A | 4/1999 | Luhmann et al. | |
| 5,913,480 A | 6/1999 | Luhmann et al. | |
| 5,925,459 A | 7/1999 | Zimmermann et al. | |
| 5,928,747 A | 7/1999 | Lühmann et al. | |
| 5,984,247 A | 11/1999 | Lühmann et al. | |
| 6,086,973 A | 7/2000 | Hazes | |
| 6,106,953 A | 8/2000 | Zimmermann et al. | |
| 6,136,397 A | 10/2000 | Lühmann et al. | |

FOREIGN PATENT DOCUMENTS

| | | |
|---|---|---|
| DE | 3331016 A1 | 10/1984 |
| EP | 0 307 624 A1 | 3/1989 |
| EP | 0 845 514 A2 | 6/1998 |

OTHER PUBLICATIONS

Derwent English abstract of EP 307624.
Derwent English abstract of DE 3331016.

* cited by examiner

*Primary Examiner*—Daniel Zirker
(74) *Attorney, Agent, or Firm*—Norris McLaughlin & Marcus

(57) ABSTRACT

Self-adhesive and redetachable stencilling tape, especially for masking when painting or varnishing, characterized in that it consists of a self-adhesive product which can be removed again by pulling in the direction of the bond plane.

18 Claims, No Drawings

STRIPPABLE STENCILLING TAPE AND IT USE

The known paper-based or film-based stencilling tapes (or punched tape sections) on the market have become established for smooth substrates but show great weaknesses when used on rough surfaces, such as coated woodchip, for example. Here, the paint frequently runs under the stencil and/or is torn off when the tape is removed.

The object of the invention is therefore to remedy this situation and so to provide a solution which leaves behind no runs and can be removed again without damage.

This object is achieved by a self-adhesive and releasible stencilling tape which can be released from a surface to which the stencilling tape is adhered by pulling on the stencilling tape in the direction of the plane of the bond formed between the stencilling and the surface. The stencilling tape comprises an adhesive film backing and optionally a carrier adhered to the adhesive film. When present, the carrier may comprise a material selected from the group consisting of polymer films, nonwovens, foams and filaments. The adhesive film may be chosen o that the adhesion of the adhesive film is lower than the cohesion of the adhesive film, the adhesion of the adhesive film is reduced when the adhesive film is extended, and the adhesive film exhibits a ratio of peel strength to tear load of at least 1:1.5. The adhesive film may be based on thermoplastic rubber and tackifying resins. The stencilling tape may be covered on one or both sides with a release paper or release film. The stencilling tape may also be punched. If the stencilling tape is covered on one or both sides with a release paper or release film, then the release paper or release film on at least one of the sides may also be punched.

The stencilling tape can be used for masking, especially during painting and varnishing, and subsequently for non-destructive and residueless removal by stripping. For painting and varnishing, such use involves applying the stencilling tape to a surface to be painted or varnished to form a bond between the stencilling tape and the surface. Thereafter, the surface is painted or varnished. The stencilling tape can then be released from the surface by pulling on the stencilling tape in the direction of the plane of the bond formed between the stencilling tape and the surface.

Suitable backings are adhesive compositions like those on the market as "tesa Posterstrip®" and as described in DE 33 31 016 C2, and also those in accordance with U.S. Pat. No. 5,516,581, EP 655 589 B1, WO 95/06691 A1, WO 97/07172 A1 and EP 761 793 A2.

Residueless detachment of the stencilling tape used in accordance with the invention is possible simply by pulling on it in the longitudinal direction parallel to the bond plane. This ease of detachment is achieved by the extension of the adhesive tape. The loss in adhesion which occurs is promoted by reducing the tack of the pressure-sensitive adhesive composition and by the reduction in film thickness caused by the extension of the adhesive film.

In this context, the pulling need not be a precise operation, since even "skewed" pulling leads to success, even if less elegant. Nor is it necessary to pull exactly in the direction of the bond plane. Here too, deviations are permitted, although care must be taken not to damage the substrate.

Suitable Materials

Backings are adhesive films as described in particular in DE 33 31 016, DE 42 22 849 and WO 92/11333.

Particularly suitable adhesive films are ones that resemble those on the market as tesa Power Strip and, in particular, as tesa Poster Strip. They possess a balance between plasticity and elasticity. After it has been pressed on, the composition remains adhering in the recessed areas and is not so elastic that it falls away from the rough substrate.

Reference is made, for example, to the example in accordance with DE 33 31 016 C2, and to the following recipe

|      |                                       | Manufacturer |
|------|---------------------------------------|--------------|
| 23.0 | Cariflex TR 1101 (synthetic SB rubber) | Shell        |
| 23.5 | Cariflex TR 1107 (synthetic SB rubber) | Shell        |
| 50.0 | Pentalyn H (rosin)                    | Hercules     |
| 0.5  | Irganox 1010 (phenolic antioxidant)   | Ciba         |
| 0.5  | Weston 399 (antioxidant)              | Ciba         |
| 0.5  | Chimassorb 944 (absorber)             | Ciba         |
| 2.0  | Kronat 2160 (additive)                | Kronos       |

The product can be processed in a twin-screw extruder; for further details reference is made to the example from DE 33 31 016 C2. It is extruded onto release paper (0.3–0.6 mm) and cut into stock rolls.

Release paper is laminated onto the composition side of the stock roll, with delamination of the original release paper at the same time. Then a PE film siliconized on one side is laminated on. This is followed by a rotary punching, the grid is removed, and the strippable stencilling tape is ready.

This stencilling tape is bonded to coated woodchip wallpaper, the PE film is peeled off, and the system is painted over with water-based paint. After the paint has dried, the stencilling tape is removed by pulling in the direction of the bond plane. The result is outstanding: no runs, no paint removal, and ultra-sharp paint edges.

Carrier

In order to adjust the shear load-bearing capacity and the force required to part the adhesive bond, the backing may optionally include a carrier. Suitable materials include polymer films, nonwovens, foams and filaments. The use of foamed carriers additionally allows better wetting when bonding materials with a rough surface.

For use, the release paper is removed from the tape and the tape is bonded, for example, to coated woodchip. When painted with water-based paint, the release film can be removed. In the case of solvent-based paints, the film preferably remains on the composition.

What is claimed is:

1. A self-adhesive and releasible stencilling tape which can be released from a surface to which said stencilling tape is adhered by pulling on said stencilling tape in the direction of the plane of the bond formed between said stencilling tape and said surface.

2. The stencilling tape according to claim 1, which comprises an adhesive film and optionally a carrier adhered to said adhesive film.

3. The stencilling tape according to claim 2, which comprises an adhesive film and a carrier adhered to said adhesive film.

4. The stencilling tape according to claim 3, wherein the carrier is selected from the group consisting of polymer films, nonwovens, foams and filaments.

5. The stencilling tape according to claim 3, wherein the adhesion of the adhesive film is lower than the cohesion of the adhesive film, the adhesion of the adhesive film is reduced when the adhesive film is extended, and the adhesive film exhibits a ratio of peel strength to tear load of at least 1:1.5.

6. The stencilling tape according to claim 3, wherein the adhesive film is based on thermoplastic rubber and tackifying resins.

7. The stencilling tape according to claim 3, which is covered on one or both sides with a release paper or release film.

8. The stencilling tape according to claim 3, which is punched.

9. The stencilling tape according to claim 8, which is covered on one or both sides with a release paper or release film, and the release paper or release film on at least one of said sides is punched.

10. The stencilling tape according to claim 2, which comprises an adhesive film without a carrier.

11. The stencilling tape according to claim 10, wherein the adhesion of the adhesive film is lower than the cohesion of the adhesive film, the adhesion of the adhesive film is reduced when the adhesive film is extended, and the adhesive film exhibits a ratio of peel strength to tear load of at least 1:1.5.

12. The stencilling tape according to claim 10, wherein the adhesive film is based on thermoplastic rubber and tackifying resins.

13. The stencilling tape according to claim 10, which is covered on one or both sides with a release paper or release film.

14. The stencilling tape according to claim 10, which is punched.

15. The stencilling tape according to claim 14, which is covered on one or both sides with a release paper or release film, and the release paper or release film on at least one of said sides is punched.

16. A process of painting a surface, said process comprising:

a) applying a stencilling tape according to any one of claims 2–15 to said surface to form a bond between said stencilling tape and said surface;

b) painting said surface; and c) releasing said stencilling tape from said surface by pulling on said stencilling tape in the direction of the plane of the bond formed between said stencilling tape and said surface.

17. A self-adhesive and releasible stencilling tape comprising:

a) a tape which can be released from a surface to which said tape is adhered by pulling on said tape in the direction of the plane of the bond formed between said tape and said surface; and b) a stencil in said tape.

18. A process of painting a surface, said process comprising:

a) applying a stencilling tape according to claim 17 to said surface to form a bond between said stencilling tape and said surface;

b) painting said surface; and c) releasing said stencilling tape from said surface by pulling on said stencilling tape in the direction of the plane of the bond formed between said stencilling tape and said surface.

* * * * *

UNITED STATES PATENT AND TRADEMARK OFFICE
CERTIFICATE OF CORRECTION

PATENT NO.   : 6,436,527 B1
DATED        : August 20, 2002
INVENTOR(S)  : Dieter Zimmermann It is certified that error appears in the above-identified patent and that said Letters Patent is hereby corrected as shown below:

<u>Title page, Item [54] and Column 1, line 1,</u>
In the title change "it" to -- its --

Signed and Sealed this

Twenty-ninth Day of April, 2003

JAMES E. ROGAN
*Director of the United States Patent and Trademark Office*